United States Patent
Hans

(10) Patent No.: US 9,665,414 B2
(45) Date of Patent: May 30, 2017

(54) COMMUNICATION PROTOCOL BRIDGE FOR CARD COMPUTING DEVICES

(71) Applicant: Oracle International Corporation, Redwood City, CA (US)

(72) Inventor: Sebastian Hans, Berlin (DE)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/602,132

(22) Filed: Jan. 21, 2015

(65) Prior Publication Data

US 2016/0210179 A1 Jul. 21, 2016

(51) Int. Cl.
G06F 13/00 (2006.01)
G06F 9/54 (2006.01)

(52) U.S. Cl.
CPC .............. *G06F 9/546* (2013.01); *G06F 9/542* (2013.01)

(58) Field of Classification Search
CPC ...................................................... G06F 9/546
See application file for complete search history.

(56) References Cited

U.S. PATENT DOCUMENTS

| | | | | |
|---|---|---|---|---|
| 7,363,378 B2* | 4/2008 | Holmes | ................. | H04L 12/581 709/203 |
| 2005/0246546 A1* | 11/2005 | Takagi | ..................... | G06F 21/62 713/182 |
| 2009/0206984 A1 | 8/2009 | Charrat et al. | | |
| 2010/0175067 A1 | 7/2010 | Appe et al. | | |
| 2012/0123945 A1* | 5/2012 | Charrat | ................. | G06Q 20/204 705/50 |
| 2013/0303086 A1 | 11/2013 | Chene et al. | | |
| 2014/0019746 A1 | 1/2014 | Hans | | |
| 2014/0040657 A1* | 2/2014 | Kiessling | .......... | H04L 12/40169 714/4.1 |
| 2015/0236756 A1* | 8/2015 | Ballesteros | .......... | H04B 5/0031 455/41.1 |

* cited by examiner

*Primary Examiner* — Andy Ho
*Assistant Examiner* — Abdou Seye
(74) *Attorney, Agent, or Firm* — Robert C. Kowert; Meyertons, Hood, Kivlin, Kowert & Goetzel, P.C.

(57) ABSTRACT

A runtime environment executing on a card computing device may handle communication of APDU messages received by a card computing device according to the HCI communication protocol over an APDU gate. APDU messages may be encapsulated and transmitted within multiple HCI messages and the runtime environment may be configured to extract and verify the APDU messages from within the received HCI messages, according to some embodiments. The runtime environment may be configured to receive commands to open an APDU pipe, manage multiple open pipes, receive incoming HCI commands, and route the encapsulated APDU messages to an appropriate application executing within the card computing device. The runtime environment may also be configured to receive APDU messages from the application, encapsulate the APDU messages within HCI messages and send the HCI messages over the same APDU pipe.

20 Claims, 6 Drawing Sheets

COMMUNICATION PROTOCOL BRIDGE FOR CARD COMPUTING DEVICES

BACKGROUND

The present invention relates generally to software development and more specifically to various aspects of language development within any of various programming languages, such as a platform-independent, object-oriented programming language, as one example.

Card computing devices may provide identification, authentication, data storage and application processing in a variety of systems from mobile phones to automated teller machines and drivers licenses. Various specifications and standards define interfaces and communication protocols for use within and between card computing devices, card readers, hosts and/or terminals. For example, the European Telecommunications Standards Institute (ETSI) has defined a set of protocols and specifications relating to communication for card computing devices.

Java has become a common development platform for creating applications for card computing devices. For instance, Java Card™ is a small Java implementation for embedded devices including card computing devices. Many Java Card™ products also rely on the GlobalPlatform Card Specifications for secure management of applications on a card computing device.

SUMMARY

Described herein are various embodiments of systems and methods for supporting communication between applications execution on card computing devices and other entities via a runtime environment of the card computing device. For instance, in some embodiments, the runtime environment may be configured to bridge two different communication protocols, thereby enabling an application configured to communicate using one protocol to communicate (using that protocol) via a different communication protocol (e.g., which the application may not be configured to utilized directly). For example, a runtime environment executing on a card computing device, such as a Java Card Runtime Environment (JCRE) executing on a Java Card device, may be configured to enable the use of application protocol data unit (APDU) messages over an APDU pipe, using the Host Controller Interface (HCI) communication protocol, according to one embodiment. For instance, a runtime environment executing on a card computing device may be configured to enable applications to exchange APDU messages with a host application (e.g., an application executing on a terminal, a secure element, a Java Micro Edition host, etc.) over the HCI communication protocol.

According to some embodiments, a runtime environment executing on a card computing device, such as the Java Card Runtime Environment (JCRE) or other virtualized execution environment, may be configured to handle the communication of APDU messages received by a card computing device over via the HCI communication protocol over a dedicated APDU gate. APDU messages may be encapsulated and transmitted within multiple HCI messages and the runtime environment may be configured to extract and verify the APDU messages from within the received HCI messages, according to some embodiments.

For example, the runtime environment may be configured to receive commands and open a communication pipe, manage multiple open pipes, receive incoming HCI commands, and route the encapsulated APDU messages to the appropriate application, such as an application executing on a secure element of the card computing device. Additionally, in some embodiments, the runtime environment may be configured to receive APDU messages from the application, encapsulate the APDU messages within HCI messages and send the HCI messages over the same APDU pipe. Thus, a runtime environment executing on a card computing device may be configured to bridge the communication between the HCI communication protocol and the APDU protocol, allowing an application execution on a secure element of the card computing device to communicate using APDUs with other entities, such as with an application executing on a terminal connected to the card computing device.

DETAILED DESCRIPTION OF EMBODIMENTS

Described herein are various embodiments of systems and methods for supporting communication between applications execution on a card computing device and other entities via a runtime environment of the card computing device. For instance, in some embodiments, the runtime environment may be configured to bridge two different communication protocols, thereby enabling applications configured to communicate using one protocol to communicate (using that protocol) via a different communication transport protocol (e.g., which the applications may not be configured to utilized directly). In some embodiments, a protocol bridge component of the runtime environment may be configured to translate between two different communication protocols. As one example, a bridge component of a runtime environment executing on a card computing device, such as a Java Card Runtime Environment (JCRE) executing on a Java Card device, may be configured to enable the use of application protocol data unit (APDU) messages over an APDU pipe, using the Host Controller Interface (HCI) communication protocol, according to one embodiment.

Figure 1:
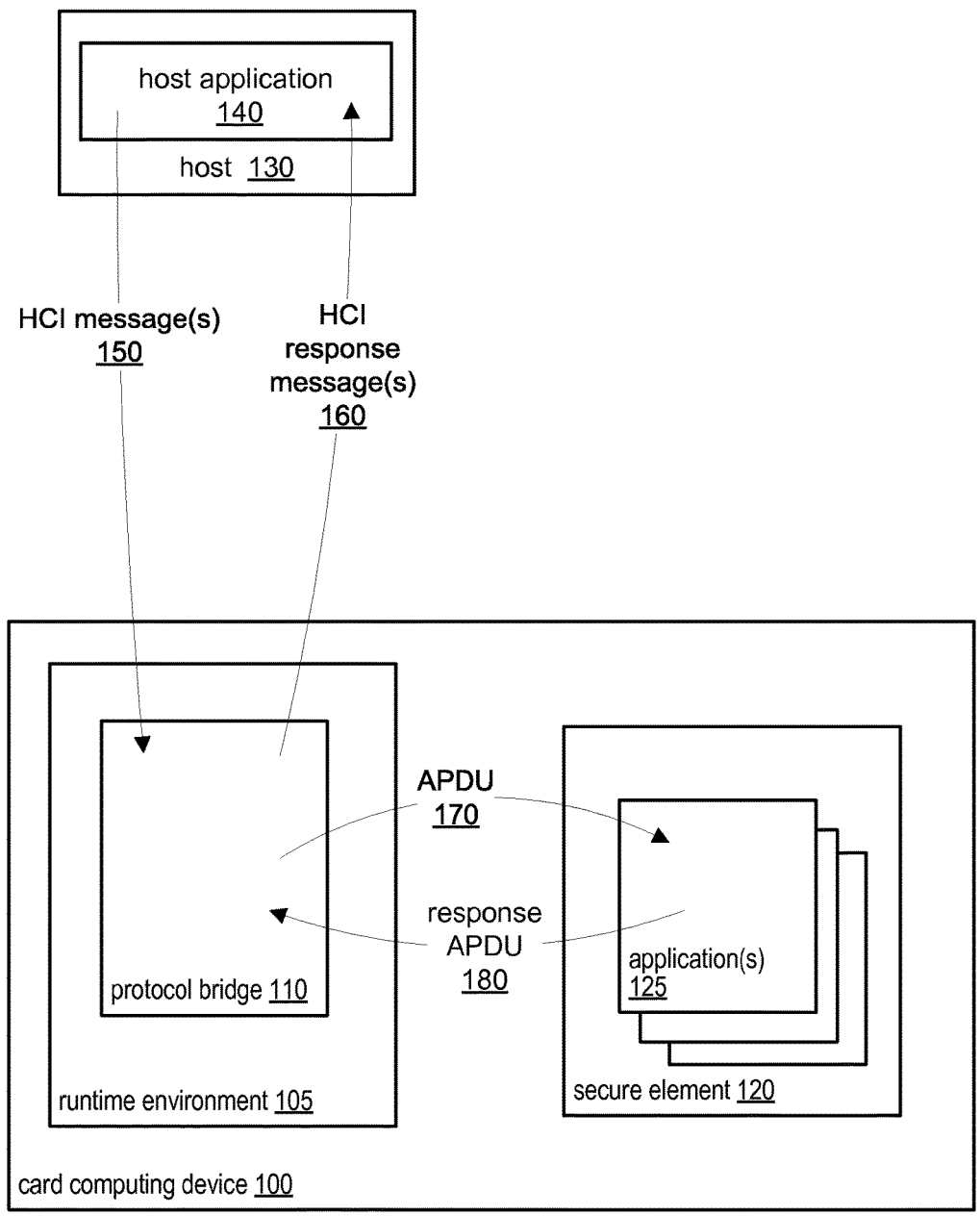
FIG. 1 is a logical block diagram illustrating a card computing device including a runtime environment configured to include a protocol bridge as describe herein according to one embodiment.

FIG. 1 is a logical block diagram illustrating a card computing device including a runtime environment configured to include a protocol bridge as describe herein according to one embodiment. As illustrated in FIG. 1, a card computing device 100 may include installed software, such as runtime environment 105, protocol bridge 110 and application 125 within secure element 120, according to various embodiments.

As referred to herein, a card computing device may refer to any of various types of pocket-sized cards with embedded integrated circuits, including, but not limited to a smart card, a chip card, an integrated circuit card (ICC), an embedded Secure Element, or a universal integrated circuit cards (UICC). A card computing device may be configured for use in various roles in any of various systems, such as to provide identification, authentication, data storage and/or application processing. Card computing devices may also provide strong security authentication for single sign-on (SSO) within large organizations. In various embodiments, card computing devices may include (but not be limited to) credit cards, automated teller machine (ATM) cards, mobile phone subscriber identity module (SIM) cards, drivers licenses, authorization cards for pay television, pre-payment cards, high-security identification cards, access control cards and telephone call payment cards. In additional a card computing device may be configured for use as an electronic wallet, such as by recording and managing one or more financial accounts.

A card computing device may be configured to include and/or utilize one more secure element(s) 120 that may include one or more applications, such as applications 125, via an operating system or runtime environment 105. In some embodiments, secure element 120 may represent a Subscriber Identity Module (SIM) that may be removable or embedded.

In general, the functions and features described herein may be described in terms of a Java Card™ platform. In some embodiments, a Java Card™ platform may represent an implementation of the GlobalPlatform specification, as provided by a Java Card Runtime Environment (JCRE). As noted above, in some embodiments, runtime environment 105 may represent a Java Card Runtime Environment (JCRE) that may include a Java Card Virtual Machine (JCVM) and may be based on a Java Virtual Machine. In some embodiments, the runtime environment may be considered the operating system of a card computing device. A card computing device may also be configured to store and execute a Java based runtime environment and include and/or execute Java applets, such as according to the Java Card™ specifications.

As used herein, Java Card™ may refer to technology that allows Java-based applications (e.g., applets) to be run securely on a card computing device. In some embodiments, a Java Card™ based card computing device may include a combination of a virtual machine (e.g., Java Card™ Virtual Machine or Java Card™ VM) and a runtime library as well as one or more applets. In some embodiments, a card computing device may be configured to execute a Java Card™ Runtime Environment (JCRE) with one or more Java applets capable to function as secure channel endpoints. As described herein, card computing device 100 may represent a Java Card™ based card computing device, runtime environment 105 may represent a Java Card™ Runtime Environment, and application 125 may represent a Java-based applet, according to various embodiments.

As shown in FIG. 1, card computing device 100 may be configured to communicate with host application 140 executing on host 130. Card computing device 100 may be configured to communicate with external devices and services, such as host 130, via any of various card-reading mechanisms, devices and/or interfaces. Additionally, in some embodiments, host 130 and/or host application 140 may represent an entity within the same or another card computing device. In some embodiments host 130 may represent a separate hardware device (e.g., a host device) executing one or more software processes or applications (e.g., host application 140).

For instance, card computing device 100 may include one or more contact pads that may be used as a communication medium between the card computing device and a host or terminal device for the card computing device. In other embodiments, a card computing device may be a contactless card computing device configured to communicate with a terminal device via radio waves. In some embodiments, host 130 may represent another secure element within card computing device 100 and host application 140 may represent an application executing within the secure element. Thus, while described mainly in terms of communication between an external host application, such as a terminal application execution on a terminal device coupled with, but possibly external to, the card computing device, in some embodiments, protocol bridge 110 may be configured to enable communication of APDUs between entities both of which may be considered within (or executing on) a card computing device (e.g., either the same or different card computing devices), over another communication protocol, such as the HCI communication protocol. In some embodiments, a host or terminal device may be considered a combination of both hardware and one or more pieces of software (e.g., processes, applications, etc.) executing on that hardware.

When communicating with a host, an application on a card computing device may be configured to use any of various communication protocols, according to various embodiments. For example, in one embodiment, card computing device 100 may be configured to use the ISO/IEC 7816 communication standard and to exchange pairs of application protocol data unit (APDU) messages with host 130 (or host application 140). An APDU message may be considered a formatted (e.g., structured) unit of data used to communicate information between two entities. An APDU message may indicate or represent a particular request on behalf of one of the entities. For instance, one entity may utilize an APDU message to request information from another entity and the other entity may use an APDU to provide that information in response.

Thus, according to some embodiments, one entity may send APDU commands while the other may return APDU responses. For example, card computing device 100 may receive command APDUs from host 130 while sending response APDUs in return. APDUs may include various fields. For instance, a command APDU may include a header and from 0-255 bytes of data while a response APDU may include a status word and from 0-255 bytes of data, according to some embodiments.

Additionally, in some embodiments, messages (e.g., APDUs) exchanged between a card computing device and a host may be used within other communication protocols. For example, the European Telecommunications Standards Institute (ETSI) has defined a secure channel mechanism to communicate between an application on a card computing device and a terminal application where the command and responses (command APDU and Response APDU according to ISO 7816) may be encapsulated within dedicated transaction commands. Thus, in some embodiments, the European Telecommunications Standards Institute (ETSI) protocol may be supported by a runtime component (e.g., runtime environment 105 and/or protocol bridge 110) of the card computing device.

In some embodiments, APDU commands (e.g., messages) may be exchanged over logical communication channels.

For example, APDU commands may be sent over a logical channel between a host and a particular application execution on the card computing device. While there may be only a single physical communication channel, there may be many logical channels (e.g., pipes) defined over that single physical channel. In some embodiments, protocol bridge 110 and/or runtime environment 105 may be configured to manage (e.g., open, use and/or close) pipes for communicating messages between applications and/or hosts, as will be described in more detail below. In some embodiments, a communication pipe may be considered a logical communication channel between two gates and a gate may be considered an entry point for a service or application that is executing within a host.

As shown in FIG. 1, protocol bridge 110 may be configured to enable communication of APDU messages between application 125 and host application 140 according to a particular communication protocol, such as by utilizing the HCI protocol, over a communication pipe, according to some embodiments. For example, the communication protocol (e.g., the Host Controller Interface (HCI) protocol) may be a communication standard that defines a uniform form of communication between two entities (e.g., between host application 140 and runtime environment 105). The communication protocol may define the particular data format of messages used to exchange information. As one example, the HCI communication protocol may define specific data formats for messages and/or command. For instance, each HCI message may include data that identifies a particular command/request as well as data associated with that command/request.

Additionally, a message may include information indicating the length of the message and/or any individual components of the message, according to some embodiments. Messages and/or data packets that conform to the definitions of the particular communication protocol may be considered to be formatted according to that communication protocol. For example, messages that conform to the HCI communication protocol definition may be considered formatted according to the HCI communication protocol.

The communication protocol may define both commands and responses used when two entities exchange information. For example, protocol bridge may use one or more HCI command messages to communicate an encapsulated APDU to application 125 and may receive an response HCI message in return, such as to indicate successful (or unsuccessful) receipt of the HCI command messages.

While described mainly in terms of example embodiments using APDU messages encapsulated within messages formatted according to the HCI communication protocol, in general, the features and functionality described herein may be performed using any of various communication protocols, according to different embodiments.

Thus, protocol bridge 110 may receive one or more HCI messages 150, that may include (e.g., encapsulate) an APDU command. The HCI messages 150 may be formatted according to the HCI communication protocol, according to some embodiments. In response, protocol bridge 110 may extract the APDU from the received HCI messages and forward it, as APDU 170, to application 125. It should be noted that prior to receiving HCI message(s) 150, protocol bridge 110 may have coordinated with host 130 (and/or host application 140) to open the particular communication pipe (e.g., a logical channel or a dedicated APDU pipe) over which to communicate. Additionally, protocol bridge 110 may have received an HCI message representing a command (or request) identifying application 125 as an endpoint to receive the extracted APDUs. The command identifying application 125 may be considered part of HCI messages 150 as illustrated in FIG. 1, according to some embodiments.

Similarly, protocol bridge 110 may receive an APDU message, such as response APDU 180, from application 125 and may encapsulate APDU 180 in one or more response HCI messages 160 for communication to host application 140. For instance, protocol bridge 110 may be configured to send response HCI message(s) 160 over the same logical channel or pipe that was used to receive HCI message(s) 150.

Thus a card computing device may be configured to integrate, such by utilized a protocol bridge, a HCI APDU gate can the runtime environment to enable the exchange of APDU's between applications, such as between an embedded secure element and a host or terminal device (or an application execution on a host or terminal device), according to various embodiments.

In addition to extracting and forwarding APDU messages (e.g., command or responses) to an application, runtime environment 105 and/or protocol bridge 110 may be configured to identify and respond to certain commands itself rather than forwarding them. For example, protocol bridge 110 may be configured to receive, identify and handle a command to select a particular application as a target (e.g., and endpoint) for forwarding future APDU commands received over the communication pipe. For instance, in one embodiment, runtime environment 105 (and/or protocol bridge 110) may be configured recognize (e.g., identify) a SELECT BY AID command identifying a particular application. In response to the SELECT BY AID (or other command to select a particular application) runtime environment 105 may be configured to associate the communication pipe with the selected application and forward future APDU messages to that particular application. Thus, runtime environment 105 may be configured to select a particular application as an endpoint for forwarding APDU messages based on an association of the selected application with the communication pipe. In other embodiments however, other commands and/or mechanisms may be used to select a particular application.

Similarly protocol bridge 110 may, in some embodiments, be configured to identify various commands to manage the communication pipe over which messages and commands may be sent and received. For instance, in one embodiment, protocol bridge 110 may be configured recognize (e.g., identify) an MANAGE CHANNEL command to open, close and/or select a logical communication channel (e.g., a pipe) over which to communicate.

As described above, according to various embodiments, protocol bridge 110 may be considered to bind runtime environment 105 to an HCI APDU gate in such a way that applications may be enabled to exchange APDUs. Thus, according to one example embodiment, a Java Card Runtime Environment may be configured can handle APDUs that received via the HCI communication protocol and a dedicated APDU Gate. The JCRE may be configured to receive the respective commands and to open an APDU pipe as well as to manage multiple open pipes. Additionally, the JCRE may be configured to receive an incoming HCI command including a SELECT BY AID command identifying an particular application and to map subsequent incoming APDU's (e.g., encapsulated in HCI commands) to the particular application (e.g., associating the communication pipe with the selected application). For instance in one embodiment, the JCRE may utilize one or more methods of the Java Card Applet class for the particular application to deliver (e.g., forward) the APDUs.

Furthermore, in one example embodiment, a JCRE may be configured to send outgoing response data from the particular application (e.g., Java Card Applet) using HCI commands (e.g., to encapsulate the APDU) to send a response APDU. The JCRE may also be configured to take care of HCI message fragmentation (e.g. APDUs encapsulated within HCI messages) and to handle of extended length APDU over the HCI communication protocol, according to one example embodiment. While described herein mainly in terms of a JCRE and Java Card Applets, other types of runtime environments (e.g., implemented using a language other than Java) may also be utilized to implement a communication protocol bridge as described herein.

Figure 2:
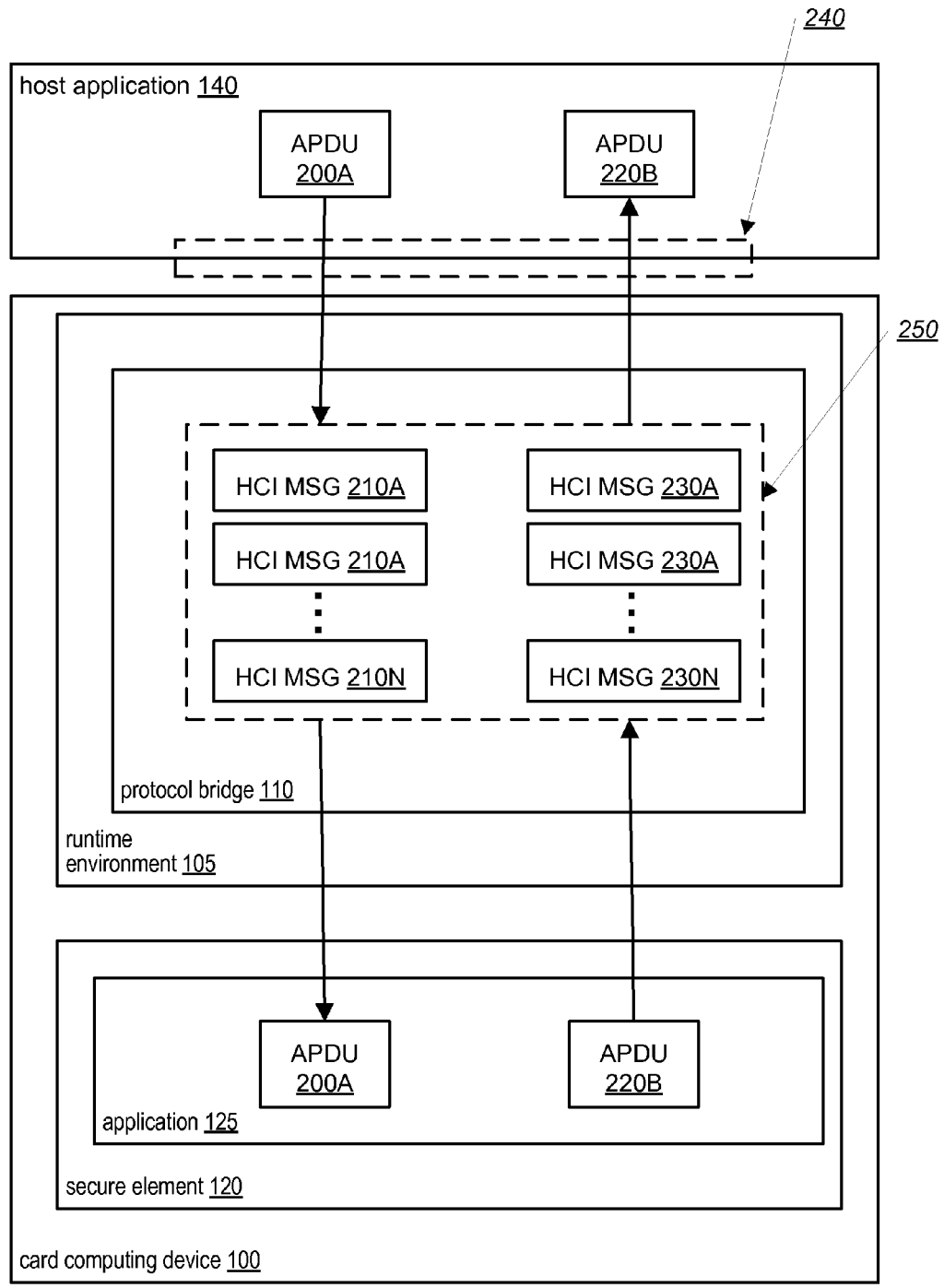
FIG. 2 is a logical block diagram illustrating a protocol bridge according to some embodiments.

Referring now to FIG. 2, protocol bridge 110 may be configured to extract APDU commands that are encapsulated within one or more HCI messages, according to some embodiments. For example, as single APDU may be fragmented and sent over gate 240 and pipe 250 using multiple HCI messages, each of which may include a portion of the APDU. Thus, host application 140 may encapsulate APDU 200A within multiple HCI messages 210A . . . 210N and send them to runtime environment 105 for delivery to application 125.

Thus, in some embodiments, all incoming data over the pipe 250 may be first received by protocol bridge 110. The individual pieces of APDU 220A may be extracted from HCI message(s) 210 and reformed into a complete APDU. Protocol bridge 110 may then forward extracted APDU 220A to application 125.

Similarly, application 125 may send a response APDU, such as APDU 220B to protocol bridge 110 for delivery over pipe 250 and gate 240 to host application 140. In some embodiments, protocol bridge 110 may be configured to receive the APDU 220B from application 125, encapsulate it within one or more HCI messages 230 and send them to host application 140 via pipe 250 and gate 240. Host application 140 may then extract APDU 220B from the HCI message(s) 230 in order to handle the response from application 125. While FIG. 2 illustrates an APDU message (e.g., a command or response) being encapsulated within multiple HCI messages, in some embodiments, an APDU command or response may be encapsulated within a single HCI command (e.g., depending on the size of the APDU).

It should be noted that while shown as separate from, and external to, card computing device 100, in some embodiments host application 140 may be part of, or execution on, card computing device 100. For example, in one embodiment, host application 140 may represent an application executing within another secure element (e.g., different than secure element 120) within card computing device 100.

Figure 3:
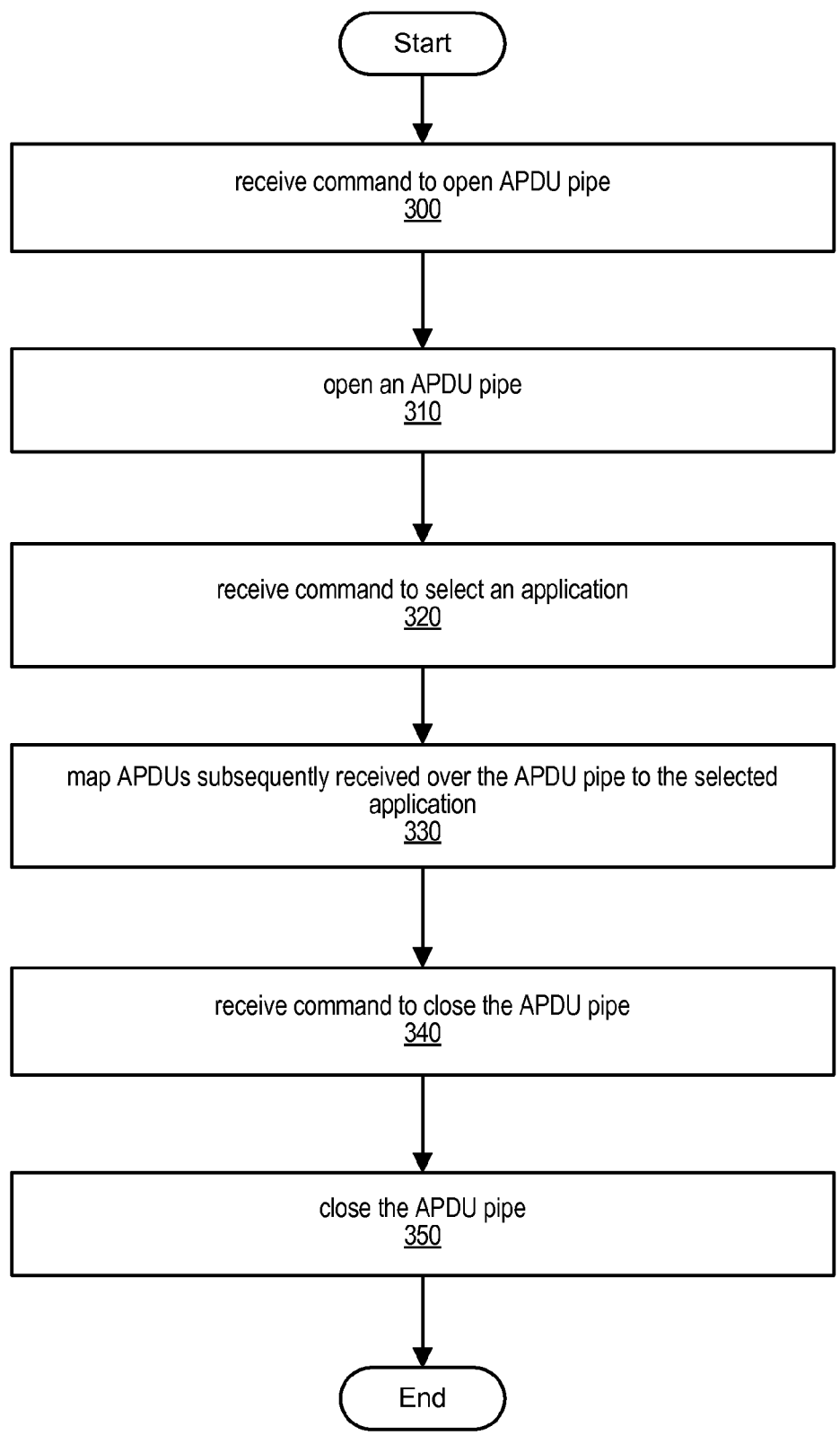
FIG. 3 is a flowchart illustrating one embodiment of a method for implementing a protocol bridge as described herein.

Turning now to FIG. 3, which is a flowchart illustrating one embodiment of a method for implementing a protocol bridge, as described herein. As shown in block 300, a runtime environment executing on a card computing device may receive a command to open an APDU pipe, according to one embodiment. As noted above, runtime environment 105 and/or protocol bridge 110 may be configured to receive, identify and respond to receiving a command (or request) to open a logical communication channel, such as pipe 250 in FIG. 2. In response to receiving the command, runtime environment 105 may open an APDU pipe, such as pipe 250, as shown in block 310. The exact method and/or mechanism used by runtime environment 105 to open a pipe, or other logical communication channel, may vary from embodiment to embodiment.

As part of managing the communication channel, runtime environment 105 may also receive a command to select an application, as shown in block 320. As described above, in one embodiment, protocol bridge 110 may receive an APDU command, possibly encapsulated with one or more HCI messages, to select a particular application as an endpoint for future APDUs received over the same pipe. The received message may include information identifying the particular application. For instance, host application 140 may send an APDU-based SELECT BY AID command that include the application identifier (AID) of application 125. In response, protocol bridge 110 may send APDUs that are subsequently received over the same communication pipe (e.g., the pipe over which the SELECT command was received) to the selected application, as in block 330. Thus, protocol bridge 110 may be configured to associate the communication pipe with the selected application. While described herein regarding the APDU SELECT BY AID command, in some embodiments, other method and/or mechanisms of selecting an application may be utilized.

Additionally, runtime environment 105 (and/or protocol bridge 110) may receive a command to close the APDU pipe, as shown in block 340. For example, in one embodiment host application 140 may send an APDU-based MANAGE CHANNEL command requesting that pipe 250 be closed. In response runtime environment 105 may close the APDU pipe previously opened, as shown by block 350.

In some embodiments, the commands to open and close the communication pipe described above may be APDU messages encapsulated within one or more HCI messages, while in other embodiments, different methods and/or mechanisms may be used to send/receive commands to open and/or close a communication pipe.

While not illustrated in FIG. 3, in some embodiments runtime environment 105 may be configured to receive additional commands regarding various configuration setting for the pipe and runtime environment 105 may configure the pipe according to received commands regarding pipe configuration. However, the exact manner and mechanism used to configure a logical communication pipe may vary from embodiment to embodiment.

In some embodiments, runtime environment 105 and/or protocol bridge 110 may be configured to communicate with the host application regarding the state of the selected application, such as by sending a "wait" HCI command to the application indicating that the selected application may need more time to process and/or respond (e.g., to the received APDU command).

Additionally, in some embodiments, an application host may open multiple, separate logical channels and communicate with different applications on different pipes. In other embodiments, however, an application host may only open a single logical channel (e.g. pipe) and communicate with different applications over the same pipe.

Similarly, in some embodiments, a single logical channel may be used by multiple application hosts to communicate with multiple applications on the card computing device. For example, in some embodiments, runtime environment 105 may be configured to utilize information in each message (either HCI-based message or APDU-based message) to determine how to dispatch (e.g., forward) each message. For instance, in one embodiment, protocol bridge 110 may be configured to utilize the command class (CLA) identifier of an APDU to determine how to handle and/or forward APDUs received from different hosts (or host applications) over the same pipe.

Figure 4:
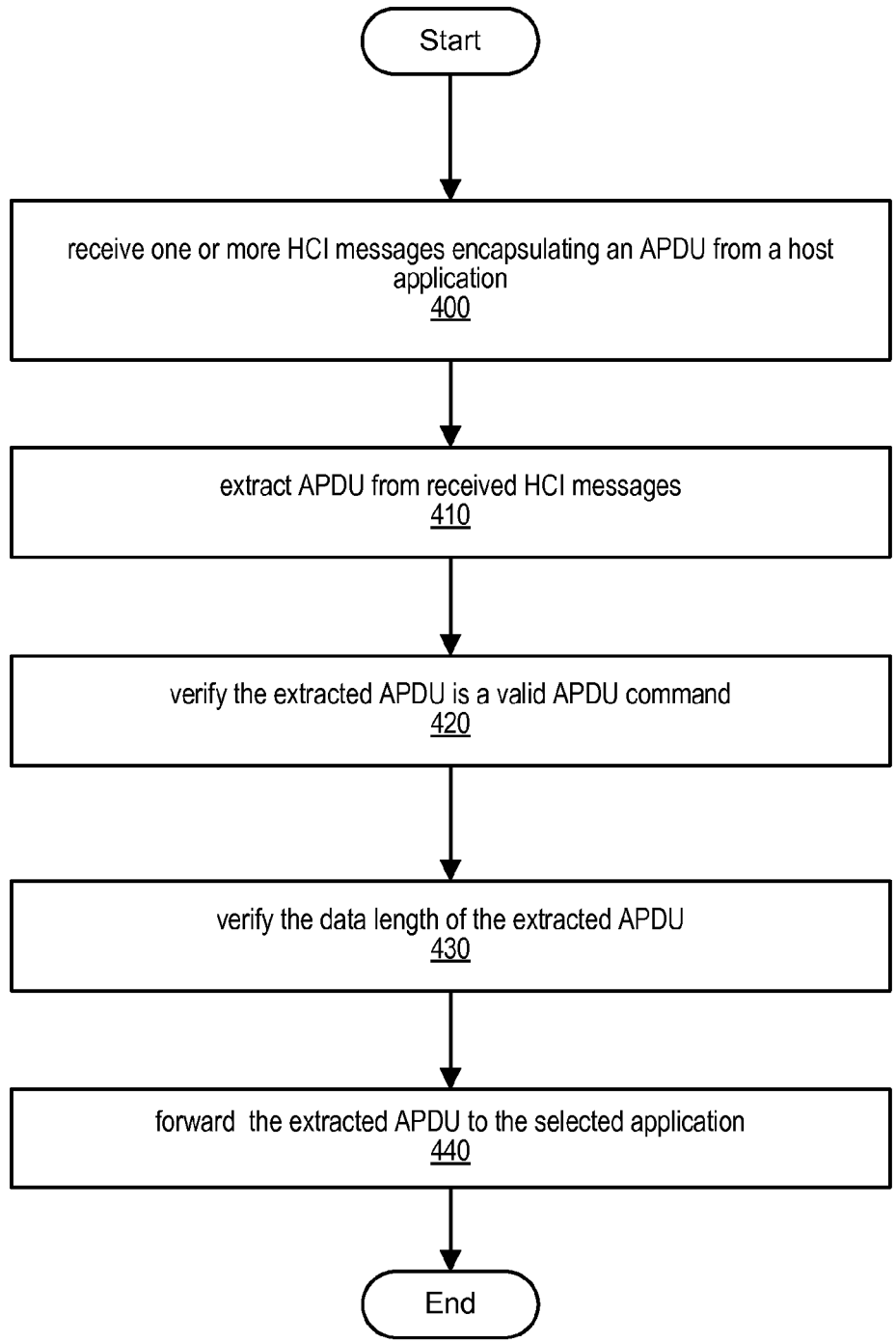
FIG. 4 is a flowchart illustrating one embodiment of a method for communicating APDU commands using an HCI communication protocol to an application on a card computing device, according to one embodiment.

FIG. 4 is a flowchart illustrating one embodiment of method for communicating APDU commands using an HCI communication protocol to an application on a card computing device, according to one embodiment. As shown in block 400, runtime environment 105 (and/or protocol bridge 110) may be configured to receive one or more HCI messages encapsulated an APDU from a host application, according to some embodiments. As described above regarding FIG. 2, for example, protocol bridge 110 may receive HCI message(s) 210A-210N into which host application 140 may have encapsulated APDU 220A.

After receiving the one or more HCI messages, runtime environment 105 may extract the APDU from the received HCI messages, as shown in block 410. For instance, runtime environment 105 may be configured to take respective portions of the APDU from individual HCI messages and then combine the respective portions to build the extracted APDU, according to some embodiments. The exact number of HCI messages used to encapsulate a particular APDU message may vary from message to message and from embodiment to embodiment.

After extracting the APDU from the HCI messages, runtime environment 105 may verify the APDU command. For instance, as shown in block 420, runtime environment 105 may be configured to verify that the extracted APDU represents a valid APDU command. For example, runtime environment 105 may verify that the extracted APDU includes an identifier of a supported command. In other words, runtime environment 105 may expect to receive APDUs that conform to a predefined set of APDU commands and each received APDU message may include an identifier of one of the predefined commands. Runtime environment 105 may, according to some embodiments, verify that the received APDU represents an expected APDU command.

Additionally, runtime environment 105 may verify the data length of the extracted APDU, as shown in block 430. For example, runtime environment 105 may verify that the size of the data extracted from the HCI messages matches a data length (e.g., the amount of data) specified as being included in the extracted APDU command or by verifying the length according to an APDU command protocol. For example, one or more of the APDU commands may be defined (e.g., predefined) to include a particular amount or length of data and runtime environment 105 may be configured to verify that the received APDU does indeed include the correct length of data for the particular APDU command. Alternatively, the APDU may include information (e.g., a data field) indicating an amount (e.g., a length) of data included in the APDU and runtime environment 105 may be configured to verify that the length of data in the APDU matches the amount indicated in the message.

After extracting and verifying the APDU command, runtime environment 105 may be configured to forward the extracted APDU to the selected application, as shown in block 440 according to some embodiments. For example, as described above, runtime environment 105 may have previously received a command to select a particular application, such as application 125, and then therefore forward subsequently received APDUs to application 125.

The exact manner in which runtime environment 105 (and/or protocol bridge 110) may forward an APDU to an application may vary from embodiment to embodiment. For example, in one embodiment, runtime environment 105 may provide one or more methods of an application programming interface (API) enabling applications to receive APDUs from runtime environment 105.

In some embodiments, runtime environment and/or protocol bridge 110 may be configured to manage multiple communication pipes and enable communication between multiple pairs of entities. For example, protocol bridge 110 may be configured to open multiple APDU pipes to respective host applications and to forward APDUs received from those hosts to respective selected applications, according to some embodiment.

Figure 5:
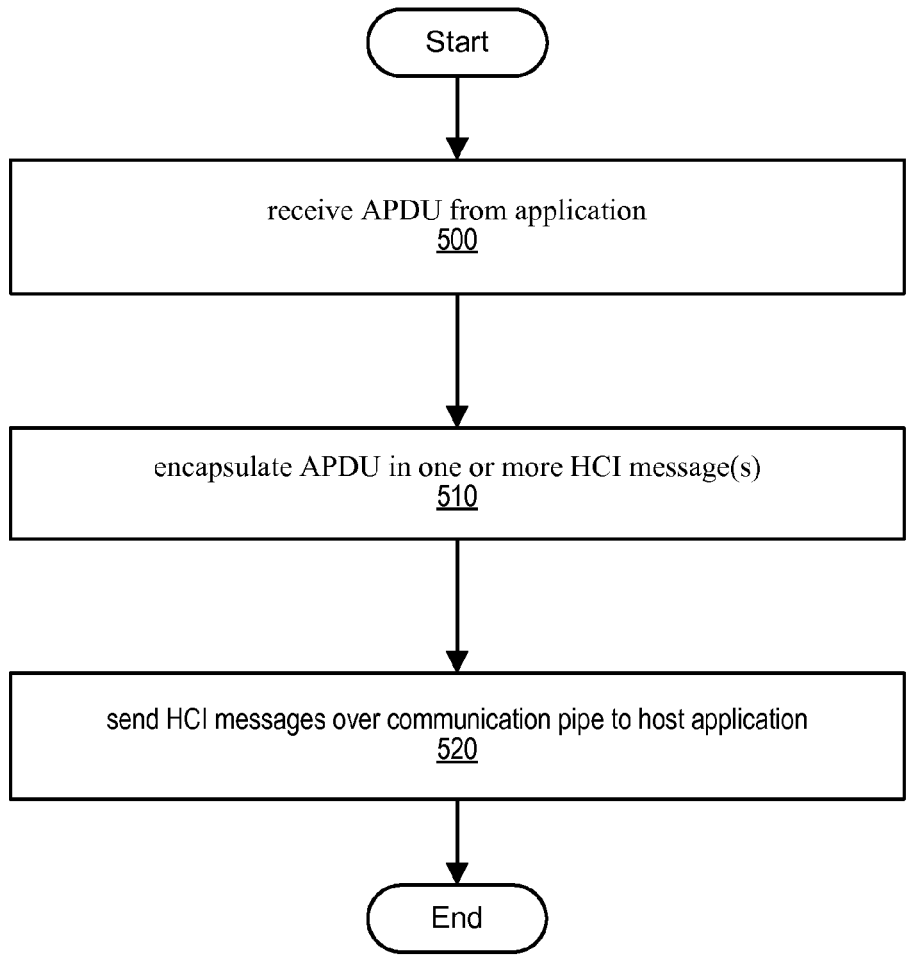
FIG. 5 is a flowchart illustrating one embodiment of a method for communicating a response APDU from an application on a card computing device, according to one embodiment.

FIG. 5 is a flowchart illustrating one embodiment of a method for communicating a response APDU from an application on a card computing device, according to one embodiment. As shown in block 500, runtime environment 105 may be configured to receive an APDU from an application on the card computing device. For example, in one embodiment, protocol bridge 110 may receive APDU 220B from application 125 as a response to APDU 220A previously received by application 125.

Runtime environment 105 may then encapsulate the APDU in one or more HCI messages, as shown in block 510 and may then send those messages to the host application over the communication pipe, as shown in block 520. For example, protocol bridge 110 may be configured to encapsulate APDU 220B within HCI messages 230A-230N, and transmit those messages over pipe 250 to host application 140 via gate 240, according to one embodiment.

The exact manner in which runtime environment 105 (and/or protocol bridge 110) may receive an APDU from an application may vary from embodiment to embodiment. For example, in one embodiment, runtime environment 105 may provide one or more methods of an application programming interface (API) enabling applications to send APDUs to runtime environment 105.

Figure 6:
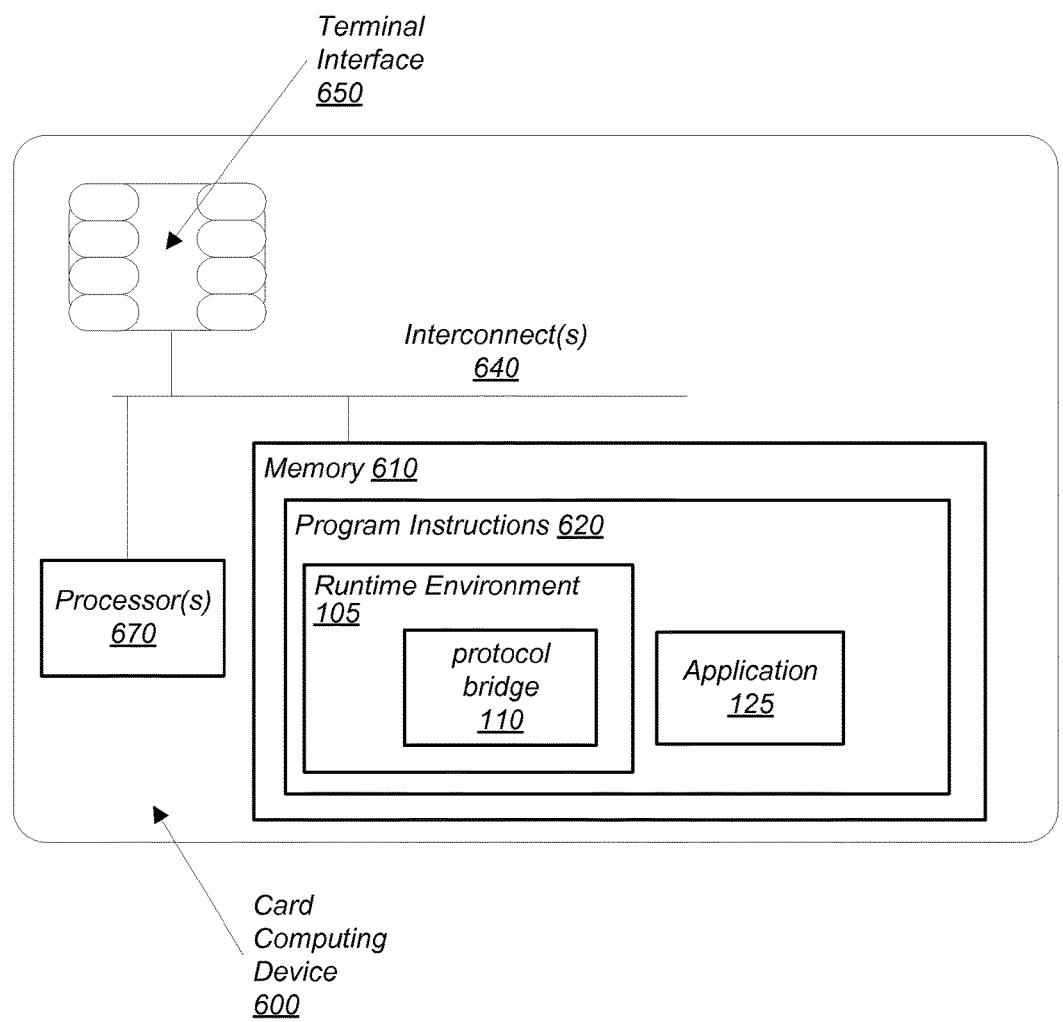
FIG. 6 is a logical block diagram illustrating an example card computing device suitable for implement a protocol bridge, according to one embodiment.

The techniques described herein for establishing and managing secure channel communications on a card computing device may be implemented in any of a wide variety of computing systems. FIG. 6 illustrates a card computing device configured to implement establishing and managing secure channel communications, as described herein and according to various embodiments.

Card computing device 600 may be any of various types of pocket-sized cards with embedded integrated circuits, including, but not limited to a smart card, a chip card, an integrated circuit card (ICC), or a universal integrated circuit cards (UICC), credit card, automated teller machine (ATM) card, mobile phone subscriber identity module (SIM) card, authorization card for pay television, pre-payment card, high-security identification card, access control card and telephone call payment card. Card computing device 600 may be configured for use in various roles in any of various systems, such as to provide identification, authentication, data storage and/or application processing.

As described herein, card computing device 600 may be configured to communicate with external devices and services via any of various card-reading devices and/or interfaces. For example, in some embodiments, card computing device 600 may include one or more terminal interfaces 650. In some embodiments, terminal interface 650 may be a communication medium between the card computing device and a host or terminal device for the card computing device. Terminal interface 650 may be configured to communicate according to any of various protocols, including but not limited to Single Wire Protocol (SWP) and Host Controller Interface (HCI) specifications.

In some embodiments, terminal interface 650 may include a contact area comprising several electrically conductive contact pads which may provide electrical connectivity when inserted into a terminal, host or other card reader. In other embodiments, terminal interface 650 may comprise a contactless communication device configured to communicate with a terminal via radio waves.

While described herein mainly in reference to pocket-sized integrated circuit cards, the methods and techniques described herein may also be performed on other computing devices. Thus, in some embodiments, card computing device 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A card computing device 600 may include a processor unit 670 (possibly including an integrated circuit, a self-programmable one-chip microcomputer (SPOM), multiple processors, a single-threaded processor, a multi-threaded processor, a multi-core processor, etc.) which may be configured to execute a runtime environment, such as runtime environment 105 including one or more components or applications, such as protocol bridge 110 and application 125, which may be present within program instructions 620 stored in memory 610 of the same card computing device 600 on which runtime environment 105 is executed or may be present within program instructions stored within a memory of another computer system similar to or different from card computing device 600.

The card computing device 600 may include one or more system memories 610 (e.g., one or more of cache, SRAM DRAM, RDRAM, EDO RAM, DDR RAM, SDRAM, Rambus RAM, EEPROM, etc.) which may be mutable or immutable, a system interconnect 640 (e.g., LDT, PCI, ISA, etc.), and a terminal interface 650 (e.g., an ATM interface, an Ethernet interface, a Frame Relay interface, etc. The memory medium may include other types of memory as well, or combinations thereof. In other embodiments, card computing device 600 may include more, fewer, or different components than those illustrated in FIG. 6. The processor(s) 670, the terminal interface 650 and the system memory 610 may be coupled to the system interconnect 640.

One or more of the system memories 610 may include program instructions 620 configured to implement some or all of the techniques described herein for establishing and managing secure channel communications (according to any of the embodiments described herein). For example, one or more of the system memories 610 may include code to implement and/or execute runtime environment 105, application 125 and/or protocol bridge 110, according to one embodiment.

In various embodiments, program instructions 620, runtime environment 105, application 125, protocol bridge 110, and/or individual sub-modules of these components may each be implemented in any of various programming languages or methods. For example, in one embodiment, application 125 and/or protocol bridge 110 may be JAVA based, while in another embodiment, they may be written using the C or C++ programming languages. Similarly, runtime environment 105 may be written using Java, C, C++, or another programming language, according to various embodiments. Moreover, in some embodiments, runtime environment 105, application 125, protocol bridge 110, and various sub-modules of these components may not be implemented using the same programming language.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:

receiving, by a runtime environment executing on a card computing device, one or more HCI messages over a communication pipe from a host application coupled to the card computing device, wherein the one or more HCI messages are formatted according to a host controller interface (HCI) communication protocol, wherein the one or more HCI messages encapsulate an application protocol data unit (APDU) message;

extracting, by a protocol bridge of the runtime environment, the APDU message from the one or more HCI messages;

selecting, by the runtime environment, an application executing on a secure element of the card computing device as an endpoint for the APDU message, wherein the application is selected based on an association of the selected application with the communication pipe; and forwarding, by the runtime environment, the APDU message to the selected application.

2. The method of claim 1, further comprising:

receiving, by the runtime environment prior to said receiving the one or more HCI messages, a command message from the host application over the communication pipe, wherein the command message represents a command to select an application, wherein the command identifies the selected application; and associating the selected application with the communication pipe.

3. The method of claim 1, further comprising:

receiving, by the runtime environment prior to said receiving the one or more HCI messages, a request to open the communication pipe; and opening, by the runtime environment in response to receiving the request, the communication pipe for communication between the host application and the runtime environment.

4. The method of claim 1, further comprising:

receiving, by the runtime environment, a response APDU from the selected application;

encapsulating, by the runtime environment, the response APDU in one or more response HCI messages, wherein the one or more response HCI messages are formatted according to the HCI communication protocol; and sending the one or more response HCI messages over the communication pipe.

5. The method of claim 1, further comprising:

verifying, by the runtime environment, that the APDU message is a valid APDU command.

6. The method of claim 5, wherein said verifying comprises:

verifying, by the runtime environment, a length of data comprised in the APDU message according to an APDU command protocol.

7. A system, comprising:

a card computing device comprising a secure element; and a host device coupled to the card computing device;

wherein the card computing device is configured to execute a runtime environment configured to:

receive one or more HCI messages over a communication pipe from a host application executing on the host device, wherein the one or more HCI messages are formatted according to host controller interface (HCI) communication protocol, wherein the one or more HCI messages encapsulate an application protocol data unit (APDU) message;

extract, by a protocol bridge of the runtime environment, the APDU message from the one or more HCI messages;

select an application executing on a secure element of the card computing device as an endpoint for the APDU message, wherein the application is selected based on an association of the selected application with the communication pipe; and forward the APDU message to the selected application.

8. The system of claim 7, wherein the runtime environment if further configured to:

receive, prior to said receiving the one or more HCI messages, a command message from the host application over the communication pipe, wherein the command message represents a command to select an application, wherein the command identifies the selected application; and associate the selected application with the communication pipe.

9. The system of claim 7, wherein the runtime environment if further configured to:

receive, prior to said receiving the one or more HCI messages, a request to open the communication pipe; and open, in response to receiving the request, the communication pipe for communication between the host application and the runtime environment.

10. The system of claim 7, wherein the runtime environment if further configured to:

receive a response APDU from the selected application;

encapsulate the response APDU in one or more response HCI messages, wherein the one or more response HCI messages are formatted according to the HCI communication protocol; and send the one or more response HCI messages over the communication pipe to the host application.

11. The system of claim 7, wherein the runtime environment if further configured to:

verify that the APDU message is a valid APDU command.

12. The system of claim 11, wherein to verify that the APDU message, the runtime environment if further configured to:

verify a length of data comprised in the APDU message with a data length indicated in the APDU message.

13. The system of claim 7, wherein the host device is a terminal device coupled to the card computing device.

14. The system of claim 7, wherein the card computing device is a Subscriber Identity Module embedded within a mobile phone.

15. A non-transitory, computer-readable storage medium storing program instructions that when executed on a card computing device cause the card computing device to perform:

receiving, by a runtime environment executing on the card computing device, one or more HCI messages over a communication pipe from a host application coupled to the card computing device, wherein the one or more HCI messages are formatted according to host controller interface (HCI) communication protocol, wherein the one or more HCI messages encapsulate an application protocol data unit (APDU) message;

extracting, by a protocol bridge of the runtime environment, the APDU message from the one or more HCI messages;

selecting, by the runtime environment, an application execution on the card computing device as an endpoint for the APDU message, wherein the application is selected based on an association of the selected application with the communication pipe; and forwarding, by the runtime environment, the APDU message to the selected application.

16. The non-transitory, computer-readable storage medium of claim 15, wherein the program instructions further cause the card computing device to perform:

receiving, by the runtime environment prior to said receiving the one or more HCI messages, a command message from the host application over the communication pipe, wherein the command message represents a command to select an application, wherein the command message identifies the selected application; and associating the selected application with the communication pipe.

17. The non-transitory, computer-readable storage medium of claim 15, wherein the program instructions further cause the card computing device to perform:
   receiving, by the runtime environment prior to said receiving the one or more HCI messages, a request to open the communication pipe; and
   opening, by the runtime environment in response to receiving the request, the communication pipe for communication between the host application and the runtime environment.

18. The non-transitory, computer-readable storage medium of claim 15, wherein the program instructions further cause the card computing device to perform:
   receiving, by the runtime environment, a response APDU from the selected application;
   encapsulating, by the runtime environment, the response APDU in one or more response HCI messages, wherein the one or more response HCI messages are formatted according to the HCI communication protocol; and
   sending the one or more response HCI messages over the communication pipe.

19. The non-transitory, computer-readable storage medium of claim 15, wherein the program instructions further cause the card computing device to perform:
   verifying, by the runtime environment, that the APDU message is a valid APDU command.

20. The non-transitory, computer-readable storage medium of claim 19, wherein said verifying comprises:
   verifying, by the runtime environment, a length of data comprised in the APDU message according to an APDU command protocol.

* * * * *